Sept. 2, 1952     H. L. OLSON ET AL     2,609,473

COLOR CONTROL FOR ELECTRIC BREAD TOASTERS

Filed Dec. 23, 1949     2 SHEETS—SHEET 1

INVENTORS
HENRY L. OLSON AND
ROBERT A. MILLER

*Caswell & Legaard*
ATTORNEYS

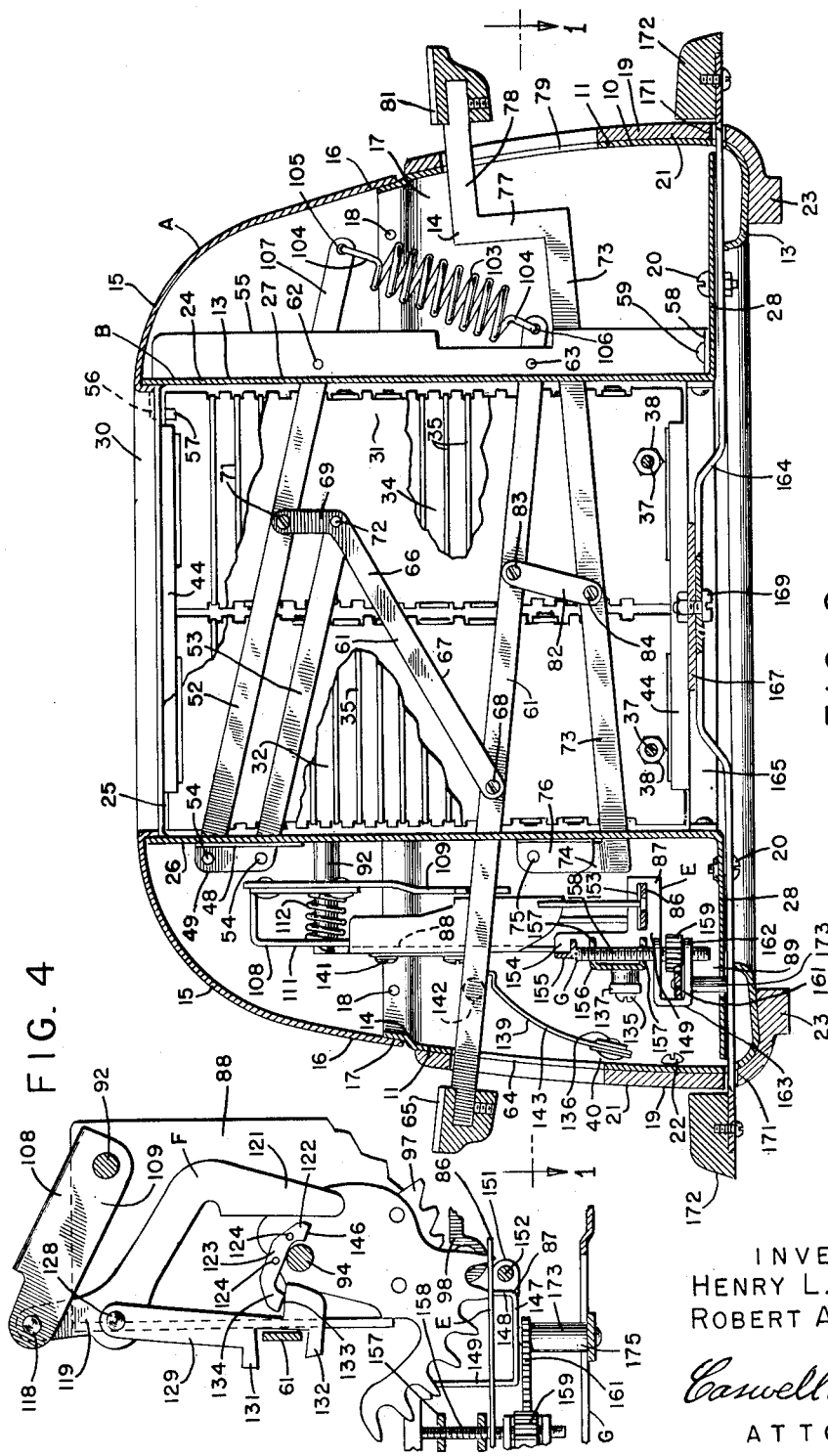

Patented Sept. 2, 1952

2,609,473

UNITED STATES PATENT OFFICE 2,609,473

COLOR CONTROL FOR ELECTRIC BREAD TOASTERS

Henry L. Olson and Robert A. Miller, Grand Haven, Mich., assignors to Camfield Manufacturing Company, Grand Haven, Mich., a corporation of Michigan Application December 23, 1949, Serial No. 134,668

13 Claims. (Cl. 219—19)

Our invention relates to bread toasters and particularly to a color control device for electric bread toasters. The present application is related to Serial No. 7,629, filed February 11, 1948 and to Serial No. 143,723, filed February 11, 1950, both having the same assignee as the present application.

An object of the invention resides in providing a control device which may be operated from either end of the toaster.

Another object of the invention resides in providing the control device with a revoluble adjusting member having a pinion rotatable therewith and with a lever carrying a rack engageable with said pinion.

A still further object of the invention resides in pivoting said lever for movement about a vertical pivot near the center of the toaster and in connecting said rack to said lever for transverse movement relative to the toaster.

Other objects of the invention reside in the novel combination and arrangement of parts and in the details of construction hereinafter illustrated and/or described.

The bread toaster disclosed in this application consists of a case A in which is disposed a framework B. The framework B and associated parts provides two vertical bread ovens C into which the bread may be placed through suitable openings in the upper portion of the case A. Within the framework B is disposed two vertically movable bread racks D which support the bread within the ovens C and which are spring biased to non-toasting position. A timing mechanism E is adapted to determine the cooking period and operates to release a latching device F whereupon the bread racks are returned to normal position at the end of the cooking period. Associated with the timing device E is a color control device G adapted to vary the length of the toasting period. This device includes a vertical shaft having a pinion mounted thereon. Beneath the framework B is a longitudinally extending lever pivoted intermediate the ends of the frame for swinging movement in a horizontal plane. This lever extends beyond the ends of the toaster and is provided with knobs by means of which the lever may be manipulated from either end of the toaster. A rack meshes with said pinion and a connector disposed between said rack and lever serves to reciprocate said rack upon swinging of the lever to rotate said shaft and adjust the color control device.

In the drawings:

Fig. 2 is a longitudinal elevational sectional view of the toaster taken substantially on line 2—2 of Fig. 1.

Fig. 4 is a fragmentary cross sectional view taken substantially on line 4—4 of Fig. 1.

Figure 1:
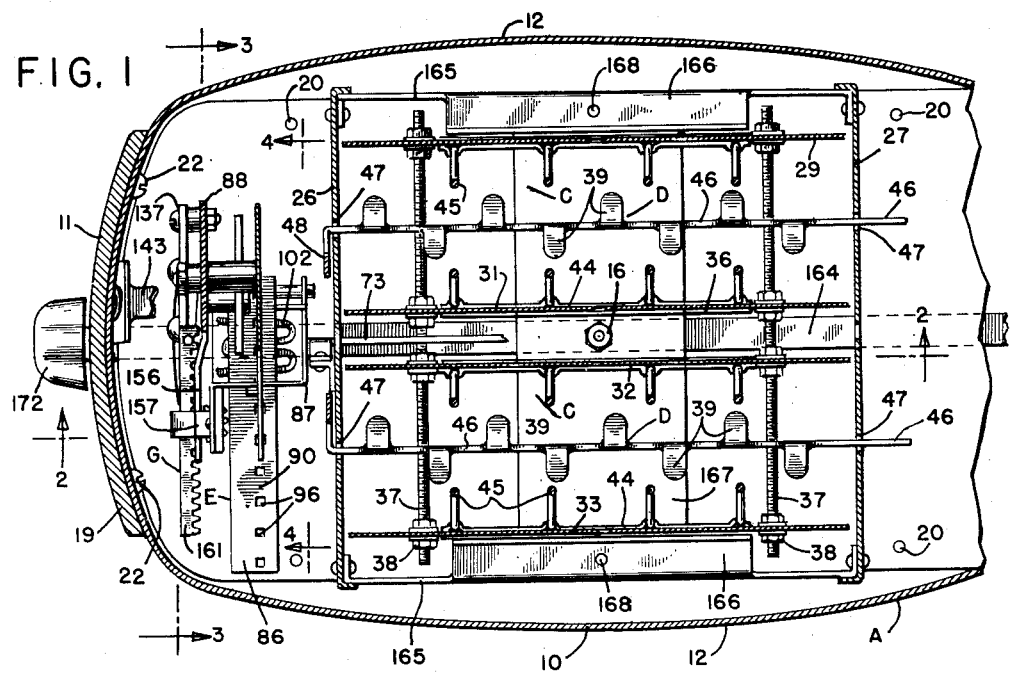
Fig. 1 is a plan sectional view of a portion of an electric toaster illustrating an embodiment of my invention and taken substantially on line 1—1 of Fig. 2.

The case A of our invention as best shown in Fig. 2 consists of a lower case section 10 which extends about the entire toaster and which has ends 11 and sides 12. The lowermost part of the case section 10 has flanges 13 extending inwardly therefrom and on which the toaster mechanism rests. The upper part of the section 10 has an offset 14 formed in the same and which provides a recess 17. Overlying the section 10 is an upper case section 15. This case section is dome-shaped in form and the lower marginal portion 16 of said case section is received within the recess 17 formed by the offset 14. Screws 18 extending through the lowermost marginal portion 16 and threaded into the offset 14 hold the parts of the case assembled. Attached to the ends 11 of case section 12 are end pieces 19 which are preferably constructed of some plastic material and which form ornaments for dressing up the case structure. These end pieces have body portions 21 which overlie the ends 11 of the case and are secured thereto by means of screws 22. These end pieces furthermore have feet 23 which are disposed beneath the section 10 and support the entire toaster above the table on which it rests to provide ventilation and retard the transfer of heat to the table. The section 15 of case A is constructed with openings 30 which register with the bread ovens C and through which the bread may be inserted into said ovens and placed upon the bread racks D.

Within the case A is located the framework B which supports the mechanism of the invention. This framework consists of a frame 24, of inverted U-shaped form, having an upper longitudinally extending frame member 25 and two vertically extending frame members 26 and 27 connected thereto. The frame members 26 and 27 have flanges 28 projecting outwardly therefrom and lying in a common plane. These flanges rest upon the flanges 13 and support the frame structure through the lower case section 10. Screws 20 hold the framework B attached to the flanges 13 of case A.

Within the framework B is provided four heating elements 29, 31, 32 and 33 which consists of sheets of mica 34 on which are wound suitable resistors 35. These heating elements in conjunction with the vertical frame members 26 and 27, form the two bread ovens C which are disposed between the heating elements 29 and 31 and between the heating elements 32 and 33. The heating elements 31 and 32 are also separated from one another to form a space 36 therebetween and in which certain of the mechanism of the invention is disposed. For supporting the heating elements 29, 31, 32 and 33 two threaded rods 37 are employed which extend through said heating elements. Nuts 38 screwed on said rods hold the heating elements mounted thereon. The heating elements 29, 31, 32 and 33 have reinforcing strips 44 secured to the upper and lower ends of the same and which also serve for attachment of guide wires 45. These guide wires are spaced from the resistors 35 and prevent the toast from coming in direct contact therewith and burning.

For supporting the toast within the oven C the two bread racks D are employed. These bread racks consist of elongated bars 46 which have lugs 39 projecting outwardly therefrom and on which the slices of bread may rest. These bars extend through slots 47 in the vertical frame members 26 and 27 and are guided for vertical movement therein. One end of each of said bars has an arm 48 bent outwardly therefrom and which terminates in a lug 49. The lugs 49 straddle two levers 52 and 53 and are pivotally connected thereto by means of rivets 54.

The lever 52 is pivoted to an upright 55 by means of a rivet 62. This upright is secured to the frame B in the following manner: The upper end of said upright has a finger 56 which extends over the horizontal frame member 25 and is formed with a lug 57 which projects downwardly through said frame member. The lower end of the upright 55 has a flange 58 projecting outwardly therefrom which is secured by means of a rivet 59 to the flange 28 of frame member 27 of frame 24. Another lever 61 hereinafter referred to as a rack lever is also pivoted to the upright 55 by means of a rivet 63 and extends completely through the frame 24 and through a slot 64 in one of the ends 11 of the case section 10 and in the overlying end piece 19. This lever forms the operating member by means of which the bread racks D are moved into toasting position and by means of which the said bread racks may be subsequently released. The lever 61 has attached to it a knob 65 by which said lever may be depressed. Extending between the lever 52 and the lever 61 is a bell crank 66 which has one long arm 67 pivoted to the lever 61 by means of a screw 68. The said lever has a short arm 69 which is pivoted to the lever 52 by means of a screw 71. Lever 53 is pivoted to the bell crank 66 by means of a rivet 72. Below the lever 61 is another lever 73. This lever extends completely through the frame 24 and its innermost end is formed with an upstanding arm 74. This arm is pivoted by means of a rivet 75 to a bracket 76 secured to the vertical frame member 26. The said lever has an offset 77 at its opposite end and which terminates in an extension 78 projecting through a slot 79 in the end 11 of case A and in the end member 19 overlying said end. A knob 81 is attached to the projecting end of the said lever. The levers 61 and 73 are connected together intermediate their ends by means of a link 82 which is pivoted to said levers by screws 83 and 84. The levers 52, 53, 61 and 73 all operate in slots 85 formed in the two vertical frame members 26 and 27. The ends of both of the levers 52 and 61 project outwardly beyond the vertical frame member 27. These ends of said levers have attached to them a tension coil spring 103 which has its ends 104 hooked into holes 105 and 106 in the said levers. The end 107 of the lever 52 projects outwardly beyond the upright 55 an appreciable amount so that considerable movement is given to the lever 52 tending to urge the said lever upwardly and to move the bread racks D into non-toasting position.

The timing mechanism E of the invention is of the type disclosed in the patent to R. Sardeson, 2,365,909, issued December 26, 1944. This timing mechanism includes a strip of bimetal 86 which is mounted for reciprocating movement in a guide 87. Guide 87 is mounted on an end plate 88 forming part of the framework B. The end plate 88 has a foot 89 which rests upon and is attached to the flange 28 of frame member 26 by means of a screw 91. The upper end of the said end plate is held in proper relation with the vertical frame members 26 by means of a spacer 92. The ends of said spacer are secured to the plate 88 and to the vertical frame member 26.

The guide 87 is constructed from sheet metal and is formed to provide a bottom 147 and end walls 148 and 149 extending upwardly therefrom. Issuing from the end wall 148 are ears 151. A pintle 152 extends through these ears and is secured to the plate 88 and frame member 26 and supports the guide 87 for swinging movement in an up and down direction. The end walls 148 and 149 have openings 153 in them and through which the strip of bimetal 86 extends and in which the bimetal is guided for longitudinal movement.

The color control mechanism is constructed as follows: The end wall 149 of guide 87 has an arm 154 extending upwardly therefrom and which terminates in a bracket 155. Issuing laterally from the end plate 88 is an arm 156 which has formed on the same two spaced ears 157. These ears are threaded to receive a screw 158 the upper end of which engages the bracket 155. This screw operates as a shaft which when rotated raises and lowers the guide 87 to vary the timing of the timing mechanism E as will be hereinafter more fully explained.

For operating the screw 158 the following construction is employed. Mounted on the said screw below the ears 157 is a pinion 159. This pinion is threaded to screw on the screw 158 and the fit between the threads of said pinion and screw are tight enough so that when the pinion is rotated a drive is effected for rotating said screw. The fit between the threads on the screw 158 and those in the ears 157 is sufficiently free to allow of rotating the screw 158 by rotating pinion 159. A screw driver slot 174 in screw 158 permits of rotating said screw independently of pinion 159. Meshing with the pinion 159 is a rack 161 which extends transversely of the toaster frame B. This rack is held in engagement with the pinion 159 by means of a U-shaped keeper 162 which straddles the pinion 159 and which is threaded to screw on the screw 158. This keeper has a portion 163 adapted to engage the back of the rack 161 and to restrain movement of said rack away from the pinion 159. The rack 161 is operated by means of a lever 164 which extends throughout the length of the toaster and which is disposed below the frame 24. Extending between the two end plates 26 and 27 and secured thereto are two longitudinal frame members 165 which have inwardly turned flanges 166. A cross bar 167 extends between the longitudinal frame members 165 and below the flanges 166 and is attached to said flanges by means of rivets 168. The lever 164 is pivoted at the center of the same to the cross bar 167 by means of a bolt 169 which extends through said lever and cross bar. The lever 164 extends through slots 171 in the ends 11 of lower case section 10 and the end pieces 19 and has attached to its ends knobs 172 by means of which said lever may be swung from side to side. Mounted on the lever 164 is a post 173 which extends upwardly therefrom and which passes through and is movable along a transverse arcuate slot 174 formed in the flange 28 of end plate 26. A screw 175 passes through the end of rack 161 and is screwed into the end of said post and serves to pivotally attach the rack to said post.

The timing mechanism E further includes a shaft 94 on which is a gear segment 95 which is adapted to cooperate with a rack 90 formed on the strip of bimetal 86 by means of spaced openings 96. The shaft 94 is secured to the plate 88. The gear segment 95 has attached to it a section 97 of a ratchet wheel, the teeth of which cooperate with a catch 98. Catch 98 is pivoted on a pintle 99 which is also attached to the plate 88. The said catch includes a finger 101 which rests on the bimetal and which is adapted to be raised to disengage the catch 98 from the section 97 of the ratchet wheel and release the gear segment 95, one tooth at a time. A spring 199 secured to the catch 98 and to the plate 88 urges the finger 101 against the strip of bimetal 86.

The bimetal strip 86 is heated by means of a heater 102 disposed within the guide 87. This heater is mounted on an insulating support 137 attached to the plate 88. It will readily be comprehended that the rate of heating of the bimetal determines the length of time required for the operation of the timing mechanism E for each cooking period.

The latching device F includes a U-shaped arm 108 hereinafter referred to as a catch arm which has spaced flanges 109 and 111. This arm is pivotally supported on the spacer 92 which is in the form of a rod and which extends through the two flanges 109 and 111. A torsion spring 112 encircles the spacer 92 between the flanges 109 and 111 and is attached to flange 109 and to the plate 88 to cause said arm to swing normally upwardly as shown in Fig. 4.

The arm 108 has pivoted to the flange 109 thereof by means of a rivet 118 a depending latch 119. Latch 119 has a catch 121 at the lower end of the same which is formed with a surface 145 adapted to engage a corresponding surface 146 on a catch engaging member 122. This catch engaging member forms part of a bar 123 which is secured to the gear segment 95 by means of rivets 124. Pivotally connected to the latch 119 by means of a rivet 128 is a depending link 129 which forms a connector between the latch 119 and the lever 61. This link is constructed with spaced fingers 131 and 132 at its lower end. These fingers straddle the lever 61 and when the said lever is moved downwardly the said link imparts to the latch 119 downward movement.

For resetting the timing device E link 129 is formed with a shoulder 133. This shoulder is adapted to engage a lug 134 on the bar 123 and to rotate the gear segment 95 in a direction opposite to that resulting from the operation of the timing mechanism E, thus resetting the timing mechanism.

The energization of the heaters 29, 31, 32 and 33 is procured through a switch mechanism 40 which includes fixed contacts 135 and a movable contact member 136. The contacts 135 are mounted on the insulating support 137 previously referred to and which is attached to the plate 88. The contact member 136 is secured to the end of a spring 139 which is also attached to the plate 88 by means of screws 141. A cam follower 142 secured to the lever 61 engages a cam 143 on the spring 139 and moves the contact member 136 into engagement with the contacts 135.

Figure 3:
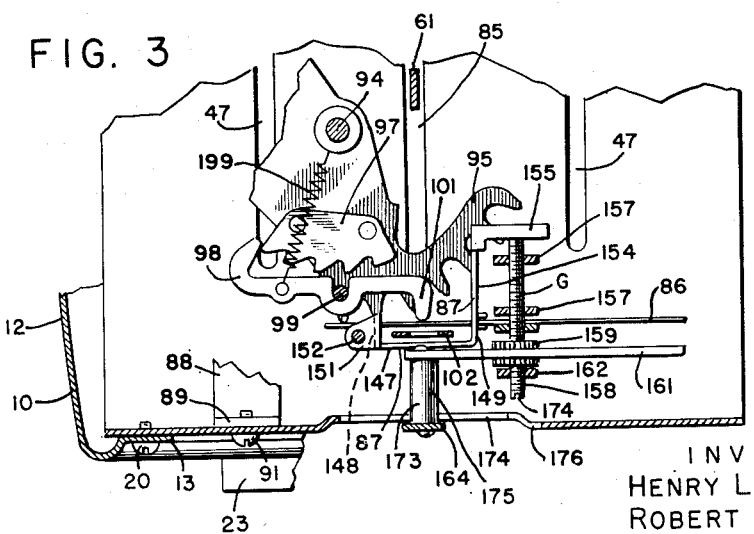
Fig. 3 is a fragmentary cross sectional view taken substantially on line 3—3 of Fig. 1.

The operation of the invention is as follows: In normal position the parts are arranged as shown in Figs. 2, 3 and 4. When lever 61 is depressed latch 119 is moved downwardly and catch 121 is brought into engagement with catch engaging member 122. Spring 103 moves lever 52 and simultaneously lever 61 upwardly and said lever through link 129, and catch 119 energizes the timing mechanism E. The timing mechanism now commences to function, the strip of bimetal 86 bowing in the usual manner to disengage catch 98 and allow the gear segment 95 and ratchet segment 97 to rotate one tooth at a time. As said gear segment 95 rotates the angularity of the surface 146 of bar 123 changes until the catch 121 slips off from the catch engaging member 122 and releases the bread racks D. At the outset initial adjustment of the color control device is procured by rotating screw 158 by means of a screw driver inserted through an enlargement 176 of the slot 174 in flange 28 of end wall 26 and engaging the screw driver slot 174. The screw 158 may be turned while the lever 164 is held from movement by forcing slippage between said screw and the pinion 159. Raising screw 158 swings the guide 87 upwardly which disengages the catch 98 from the teeth of ratchet segment 97. This reduces the amount of bowing of the strip of bimetal 86 requisite for releasing a tooth of said ratchet segment and correspondingly the length of the cooking period. The reverse movement of screw 158 produces the opposite results. Thereafter further adjustment may be made by shifting lever 164 from side to side. In such case the rack 161 is moved which rotates screw 158 through pinion 159 to procure the requisite timing of the mechanism E to give the desired color to the toast.

The advantages of the invention are manifest. The color of the toast can be controlled from either end of the toaster by movement of the color adjusting lever in the same direction with reference to either end of the toaster. The movement of the color adjusting lever is different from that of the operating lever so that no confusion results. In addition the knobs for the color control lever are disposed at the lowermost portion of the toaster where the same are out of the way when operating the operating lever. The invention is simple in construction and positive in operation and utilizes relatively inexpensive parts.

Changes in the specific form of our invention, as herein described, may be made within the scope of what is claimed without departing from the spirit of our invention.

Having described our invention, what we claim as new and desire to protect by Letters Patent is:

1. In a bread toaster a frame, a timing mechanism at one end of the frame including a rotatable threaded shaft adapted upon rotation to vary the timing period, tapped bearings carried by said frame and supporting said shaft for rotational and longitudinal movement, a nut on said shaft frictionally engaging the same for rotating the shaft, operating means for rotating said nut, and means for rotating said shaft relative to said nut.

2. In a bread toaster a frame, a timing mechanism at one end of the frame including a revoluble adjusting member adapted upon rotation to vary the timing period, a pinion rotatable with said revoluble member, a lever extending longitudinally of said frame and pivoted intermediate the ends of the frame and movable transversely of the frame at the ends of the frame, a transversely extending rack meshing with said pinion, a connector between said rack and lever and a keeper engageable with said rack for holding said rack in mesh with said opinion.

3. In a bread toaster a frame, a timing mechanism at one end of the frame including a revoluble adjusting member having a vertical axis adapted upon rotation to vary the timing period, a pinion rotatable with said revoluble member, a lever extending longitudinally of said frame, pivot means for said lever disposed intermediate the ends of the frame and having a vertical axis, said lever swinging in a horizontal plane, a rack meshing with said pinion and disposed in a horizontal plane, a connector between said lever and rack and a keeper engageable with said rack for holding said rack in mesh with said pinion.

4. In a bread toaster a frame, a timing mechanism at one end of the frame including a revoluble adjusting member having a vertical axis adapted upon rotation to vary the timing period, a pinion rotatable with said revoluble member, a lever extending longitudinally of said frame, pivot means for said lever disposed intermediate the ends of the frame and having a vertical axis, said lever swinging in a horizontal plane, a rack meshing with said pinion and disposed in a horizontal plane, pivot means between said lever and rack and having a vertical axis and a keeper engageable with said rack to hold the rack in mesh with said pinion.

5. In a bread toaster a frame, a timing mechanism at one end of the frame including a revoluble adjusting member having a vertical axis adapted upon rotation to vary the timing period, a pinion rotatable with said revoluble member, a lever extending longitudinally of said frame, pivot means for said lever disposed intermediate the ends of the frame and having a vertical axis, said lever swinging in a horizontal plane, a rack meshing with said pinion and disposed in a horizontal plane, a post attached to said lever, said rack being pivoted to said post for swinging movement about a vertical axis and a keeper engageable with said rack to hold the rack in mesh with said pinion.

6. In a toaster a frame comprising end plates and flanges extending outwardly therefrom at the lowermost ends of the same, a support extending across said frame near the bottom thereof, a timing mechanism disposed adjacent one of said end plates and disposed above the flange issuing therefrom, said timing mechanism including a revoluble member having a vertical axis and disposed above said flange and adapted upon rotation to vary the timing period, a pinion rotatable with said revoluble member and disposed above said flange a lever extending longitudinally of said frame, pivot means for said lever disposed intermediate the ends of the frame and having a vertical axis, said lever swinging in a horizontal plane, a rack meshing with said pinion and disposed in a horizontal plane, said rack being disposed above said flange, said flange having a transverse slot therein below said rack, a post mounted on said lever and extending through and movable along said slot, pivot means between said rack and post and a keeper engageable with said rack and holding said rack in mesh with said pinion.

7. In a bread toaster a frame, a timing mechanism at one end of the frame including a vertical shaft adapted upon rotation to vary the timing period, a pinion mounted on said shaft, a lever extending longitudinally of said frame and pivoted intermediate the ends of the frame and movable transversely of the frame in a horizontal plane at the ends of the frame, a rack meshing with said pinion and extending transversely of the frame, pivot means between said lever and rack, and a keeper pivoted on said shaft and engageable with said rack for holding said rack in mesh with said pinion.

8. In a bread toaster a frame, a timing mechanism at one end of the frame including a vertical shaft adapted upon rotation to vary the timing period, bearings for said shaft carried by said frame, a pinion mounted on said shaft, a lever extending longitudinally of said frame and pivoted intermediate the ends of the frame and movable transversely of the frame in a horizontal plane at the ends of the frame, a rack meshing with said pinion and extending transversely of the frame, pivot means between said lever and rack and a yoke pivoted on said shaft and embracing said pinion and rack, said yoke being engageable with rack to hold the rack in mesh with said pinion.

9. In combination, a frame comprising vertically extending end plates and flanges extending outwardly therefrom, a bread toasting oven disposed within said frame, heating means therefor, a timing mechanism disposed adjacent one of said end plates and including a revoluble member having a vertical axis disposed above the flange on said end plate and adapted upon rotation to vary the timing period, an electric switch actuated by said timing mechanism and controlling the energization and deenergization of said heating means, a pinion rotatable with said revoluble member and disposed above said flange, a lever extending longitudinally of said frame and disposed below said flanges, pivot means acting between said lever and frame and disposed intermediate the end plates of said frame and guiding said lever for movement in a substantially horizontal plane, a rack meshing with said pinion and disposed in a horizontal plane, said rack being disposed above said flange, said flange having a transverse slot therein below said rack, a post mounted on said lever and extending through and movable along said slot, pivot means between said rack and post and a keeper engageable with said rack and holding said rack in mesh with said pinion.

10. In combination, a frame comprising vertically extending end frame members, a bread toasting oven disposed within said frame, heating means therefor, a timing mechanism disposed adjacent one of said end frame members and including a revoluble member having a vertical axis, and adapted on rotation to vary the timing period, an electric switch actuated by said timing mechanism and controlling the energization and deenergization of said heating means, a pinion rotatable with said revoluble member, a lever extending longitudinally of said frame and disposed below said bread toasting oven, pivot means having a vertical axis acting between said lever and frame and disposed intermediate the end members of said frame and guiding said lever for movement in a substantially horizontal plane, manual operating members disposed one on each end of said lever and accessible at the ends of the frame, a rack meshing with said pinion and disposed in a horizontal plane, pivot means disposed between said rack and said lever and causing longitudinal movement of said rack upon swinging of said lever, and a keeper engageable with said rack and holding said rack in mesh with said pinion.

11. In combination, a frame comprising vertically extending end frame members, a bread toasting oven disposed within said frame, heating means therefor, a timing mechanism disposed adjacent one of said end frame members and including a shaft having a vertical axis, and adapted on rotation to vary the timing period, an electric switch actuated by said timing mechanism and controlling the energization and deenergization of said heating means, a pinion rotatable with said shaft, a lever extending longitudinally of said frame and disposed below said bread toasting oven, pivot means having a vertical axis acting between said lever and frame and disposed intermediate the end members of said frame and guiding said lever for movement in a substantially horizontal plane, manual operating members disposed one on each end of said lever and accessible at the ends of the frame, a rack meshing with said pinion and disposed in a horizontal plane, pivot means disposed between said rack and said lever and causing longitudinal movement of said rack upon swinging of said lever, and a yoke having arms pivoted on said shaft and embracing said rack and pinion, said yoke engaging said rack and holding the rack in mesh with said pinion.

12. In combination a frame, a case having ends enclosing said frame and forming with said frame adjacent one end thereof an end compartment, a timing mechanism carried by said frame and mounted in said end compartment, said timing mechanism including a revoluble member having a substantially vertical axis and adapted upon rotation to vary the timing period, a pinion rotatable with said revoluble member, a lever disposed below said frame and extending from end to end of said case, pivot means for said lever having a substantially vertical axis and acting between said frame and said lever at a locality intermediate the ends of said lever and guiding said lever for movement in a substantially horizontal plane, manual operating members disposed one on each end of said lever and accesible at the ends of the case for swinging said lever from side to side, a rack meshing with said pinion and disposed in a substantially horizontal plane above said lever and extending transversely of said lever, pivot means disposed between said rack and lever and causing longitudinal movement of said rack upon swinging of said lever, said pivot means partially supporting said rack and a keeper engageable with said rack and partially supporting said rack and holding said rack in engagement with said pinion and guiding said rack for longitudinal movement.

13. In a color control for bread toasters having a case, a support at the lower portion thereof and a timing mechanism at one end including a revoluble member with a substantially vertical axis and adapted upon rotation to vary the timing period to vary the color of the toast, said color control device including a pinion rotatable with said revoluble member, a lever disposed below said case and extending from end to end of said case, pivot means for said lever having a substantially vertical axis and acting between said support and said lever at a locality intermediate the ends of said lever and guiding said lever for movement in a substantially horizontal plane, manual operating members disposed one on each end of said lever and accessible at the ends of the case for swinging said lever from side to side, a rack meshing with said pinion and disposed in a substantially horizontal plane above said lever and extending transversely of said lever, pivot means disposed between said rack and lever and causing longitudinal movement of said rack upon swinging of said lever, and guide means engaging said rack and guiding said rack for longitudinal movement and maintaining said rack in mesh with said pinion.

HENRY L. OLSON.
ROBERT A. MILLER.

REFERENCES CITED

The following references are of record in the file of this patent:

UNITED STATES PATENTS

| Number | Name | Date |
|---|---|---|
| Re. 18,923 | Harris | Aug. 22, 1933 |
| 2,237,146 | Ireland | Apr. 1, 1941 |
| 2,337,124 | Olving | Dec. 21, 1943 |
| 2,365,909 | Sardeson | Dec. 26, 1944 |

FOREIGN PATENTS

| Number | Country | Date |
|---|---|---|
| 5,538 | Great Britain | of 1911 |